United States Patent
Härdtle

(10) Patent No.: US 7,445,582 B2
(45) Date of Patent: Nov. 4, 2008

(54) METHOD FOR CONTROLLING AN ACTUATOR OF A STARTING CLUTCH IN THE AUTOMATIC TRANSMISSION OF A VEHICLE

(75) Inventor: Wilhelm Härdtle, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 233 days.

(21) Appl. No.: 10/566,004

(22) PCT Filed: Jul. 3, 2004

(86) PCT No.: PCT/EP2004/007260

§ 371 (c)(1),
(2), (4) Date: Jan. 25, 2006

(87) PCT Pub. No.: WO2005/018977

PCT Pub. Date: Mar. 3, 2005

(65) Prior Publication Data

US 2008/0045379 A1 Feb. 21, 2008

(30) Foreign Application Priority Data

Jul. 29, 2003 (DE) ................................ 103 34 451

(51) Int. Cl.
*B60W 10/02* (2006.01)
(52) U.S. Cl. .................... 477/176; 477/70; 477/80; 477/166; 477/180
(58) Field of Classification Search ................. None
See application file for complete search history.

(56) References Cited

U.S. PATENT DOCUMENTS

| 4,914,983 | A | 4/1990 | Simonyi et al. | |
|---|---|---|---|---|
| 6,152,275 | A | 11/2000 | Fischer et al. | |
| 6,549,838 | B2 * | 4/2003 | O'Neil et al. | ............... 701/51 |
| 7,010,407 | B2 * | 3/2006 | Karczag et al. | ............... 701/67 |
| 2004/0216296 | A1 | 11/2004 | Ahnert | |
| 2006/0237249 | A1 | 10/2006 | Steen et al. | |

FOREIGN PATENT DOCUMENTS

| DE | 196 02 006 A1 | 8/1996 |
|---|---|---|
| DE | 101 09 662 A1 | 9/2002 |
| DE | 101 28 853 A1 | 12/2002 |
| DE | 102 35 258 A1 | 4/2003 |
| EP | 0 312 018 A2 | 4/1989 |

* cited by examiner

*Primary Examiner*—David D. Le
(74) *Attorney, Agent, or Firm*—Davis Bujold & Daniels P.L.L.C

(57) ABSTRACT

A method for the control of an actuator of a starting clutch of a motor vehicle. The actuator is so regulated by a control apparatus that the starting clutch is closed upon the presence of a desire for starting, as well as closed by an adjusted, transmission ratio, and the clutch is opened upon the termination of the starting procedure. For the freeing of a vehicle from a roadway obstruction by way of a rocking process of the vehicle, it is proposed that the starting clutch, during a starting procedure and by way of control of the actuation actuator, is operated in a fully automatic manner in such a way, that the torque ($M\_K$) periodically varies.

19 Claims, 1 Drawing Sheet

METHOD FOR CONTROLLING AN ACTUATOR OF A STARTING CLUTCH IN THE AUTOMATIC TRANSMISSION OF A VEHICLE

This application is a national stage completion of PCT/EP2004/007260 filed Jul. 3, 2004 which claims priority from German Application Serial No.103 34 451.9 filed Jul. 29, 2003

FIELD OF THE INVENTION

The invention concerns a method for the control of an energizing actuator of a starting clutch of an automatic transmission of a motor vehicle.

BACKGROUND OF THE INVENTION

Generally well known among drivers of motor vehicles is the fact that in the operation of such a vehicle, situations can arise in which the vehicle becomes immobilized due to blockages on the traveled road. For instance, one can think of driving into an impassable place in deep snow, loose sand or into a short and deep depression in the roadway.

As a rule, accomplished drivers with manually operated transmissions of conventional vehicles can free themselves from the mired position by the so-called "back-and-forth" rocking process.

When this occurs, in the case of a vehicle which is motionless although the motor is running, first a clutch pedal is activated, a transmission shift position engaged and then the clutch pedal is released. The vehicle then moves itself until those forces working against it in the direction of travel become so large that the driver must, once again, activate the clutch pedal to avoid stalling the motor. Subsequently, the vehicle rolls back, now beyond its original starting position, until it is stopped in the opposite direction, again by the road obstruction and is, once again, in a standstill condition. At this moment, the driver releases the clutch pedal, now in a chosen gear position, so that the vehicle in its next starting trial tries to overcome the obstructing means by a somewhat longer approach at a higher speed. The resulting rocking process is then repeated until the vehicle frees itself or this method has to be abandoned.

The above method of operation can be supported by well versed drivers, in that this alternating "to-and-fro" synchronistic movement of the vehicle requires the engagement of a forward and a reverse gear stage.

Where vehicles that are equipped with an automatic transmission are concerned, especially in a case of a step-to-step transmission having an automatic starting clutch, the overcoming of such roadway obstructions shows itself as being somewhat more difficult since the driver has no direct influence over the activation of the starting and shifting of the clutch action.

To this end, DE 101 28 853 A1 has let it be known that a motor vehicle with an automatic, double-clutch transmission exists wherein, by way of a particular apparatus, the vehicle can be brought into the above described to-and-fro rocking phase and can be manually operated within this phase.

Furthermore, in this state of the technology, provision is made that in a case of double-clutch transmissions for the carrying out of the rocking process, both a forward gear as well as the reverse gear of the transmission must be capable of engagement. The two clutches of this generally heavy duty transmission can be accordingly so in-and-out engaged alternately, that the vehicle in a roadway blockage, on a short term basis, can be driven forward and then backwards as far as possible. For this operation, an activation apparatus is made available within reach of the driver in which the driver can manually take over the clutch activation and can also be in control of the forward and backward motion of the vehicle as far as any limitation of this arrangement permits.

This activation apparatus can be a component of a shifting device employed for the signaling of ratio changing and/or as a reaction to a desire for a gear stage change, which allows shifting into a rocking process by way of a prior activation of a separate shifting device. Advantageously, it is possible, however, that a shifting device can be installed, where the transmission gear stages can be shifted sequentially up or down.

Even if the known device can be employed with complete advantage for automatic, double-clutch transmissions, nevertheless, this arrangement carries the disadvantage that the rocking process does not run itself automatically, but must be manually and cleverly carried out by the vehicle driver. This places a problem for inexperienced drivers in that they do, indeed, have a device for rocking, but which they are unable to manipulate at its optimum efficiency.

Moreover, this rocking process cannot be used with automatic transmissions, which are based on conventional gearshift.

Giving consideration to this background, the invention should exhibit the possibility that a vehicle with an automatic shift transmission can overcome the described roadway obstructing occurrences. In carrying this possibility out, complete avoidance is to be made, counter to the state of the technology, which calls for a manual intervention of the rocking process to enable inexperienced driver to make the most of their available opportunities. Nevertheless, it is possible that, in addition, a manual means of operation should be made available.

SUMMARY OF THE INVENTION

The purpose of the invention is based on the knowledge, that by way of a well conceived, periodical activation of the starting clutch in the concept of shut and open, which is made applicable under roadside conditions and roadway hindrances, the desired rocking process of a vehicle can be achieved and which process effectively accomplishes its goal.

In accordance with the above, a method for the control of an actuator of a starting clutch in an automatic transmission of a motor vehicle is proposed, wherein the actuator of a control apparatus is so regulated that the starting clutch is closed upon the expression of a startup desire, as well as closed by a pre-determined transmission ratio and is opened at the conclusion of the startup procedure. Additionally, in order to begin the rocking process, provision is made that the starting clutch, during an initial procedure by control of the actuator, is so operated, that periodically a diversion occurs in its transferred torque M_K.

These periodic variations, as described above, are computable in such a manner in regard to the vehicle and are directly so related to the actual roadway obstruction that the vehicle can automatically overcome an occurring blockage of travel. In particular, the parametric values to be considered in the computation advantageously include the speed of the vehicle, the weight of the vehicle, the radius of the vehicle wheels, the ground adherence of the vehicle wheels and the magnitude of the forces due to the obstruction, which are counter to the direction of travel during the rocking process.

Moreover, during the periodic functioning of the actuator of the starting clutch, it is seen as advantageous that the transmission ratio remains unchanged so that, by means of such rocking procedures, no extreme wear on the synchronization elements of the automatized shift-transmission need be expected.

The periodic activation of the clutch would advantageously begin by means of various sensors, if a determination is established, that the driving speed is very low or, indeed, at zero, and a slipping of at least one of the vehicle wheels oversteps a predetermined threshold. This borderline condition takes into consideration a vehicle firmly stuck in deep snow or in loose sand.

Another variant of the invention provides that the periodic operation can only be carried out if a prior determination has been made from the control equipment that the speed of driving is very low or, indeed, is at zero and the drive moment M_Z of the force working against the vehicle wheels oversteps a predetermined threshold value. By way of these measures, for example, that operational situation is taken into consideration, wherein the vehicle is held in place in a comparatively deep, roadway depression.

In another embodiment of the invention, provision is made that the periodic operation of the clutch actuators and also the starting clutch can only be carried out if, from the control apparatus, it has been previously determined that a releasing element for the activation of the periodic programming has been activated by a person within the vehicle. Thereby it becomes possible that, deviating from a self-operating, fully automatic freeing of the vehicle from its restricting obstruction, the freeing can be done by the individual efforts of a vehicle driver.

After the choice of the manual operation method, the periodic operation, for example, can then be released. This is done if the vehicle driver activates the gas pedal for power control of the vehicle motor above a predetermined set angle. The set angle value can be that angle, which is known as the so-called kick-down position, which is known to the expert. When the gas pedal, forming this kick-down linkage, retracts, the control apparatus terminates the periodic activation of the clutch activator.

For additional manual influencing of a rocking process, provision can be made that the activation frequency can be adjusted for the periodicity of the actuator, the actuator being, for example, the starting clutch. This adjustment is made on another, separate actuator or on the gas pedal itself.

Advantageously, stored in the control apparatus are additional computation algorithms, with the aid of which, at least the activation frequency of the actuator can be calculated by way of an analysis of the driving speed, the controlled direction, the type of control, and/or the speed of control response for the activation elements and/or the gas pedal.

Finally, it should be mentioned, that the control process in accordance with the invention, as well as its embodiments, are exceptionally well suited to the control of an automatic transmission.

BRIEF DESCRIPTION OF THE DRAWINGS

The invention will now be described, by way of example, with reference to the accompanying drawings in which.

DETAILED DESCRIPTION OF THE INVENTION

Figure 1:
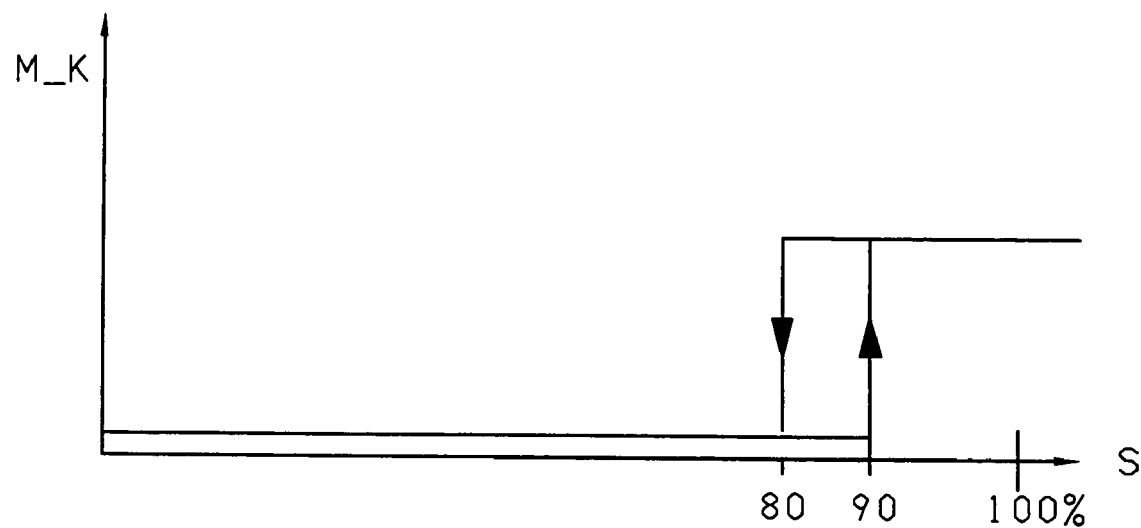
FIG. 1 is a diagram in which the clutch torque M_K is plotted against the regulating distance S of a gas pedal.

Accordingly, FIG. 1 demonstrates that the starting clutch is operated over a wide portions of the gas pedal angle S during normal clutch control functions for vehicle starting or maneuvering in terminal yards.

As soon as a vehicle driver, using a manual operation of the invented control method, has engaged the gas pedal into a kick-down position with a deflection angle of 90% of the maximum regulated path then, by a corresponding activation of the clutch actuator, the starting clutch is forced into an alternative manner of opening and closing. As is indicated by the two vertical directive arrows in FIG. 1, this rocking process is maintained just as long as the gas pedal remains engaged in the kick-down position and the obstruction in the roadway is not overcome.

Figure 2:
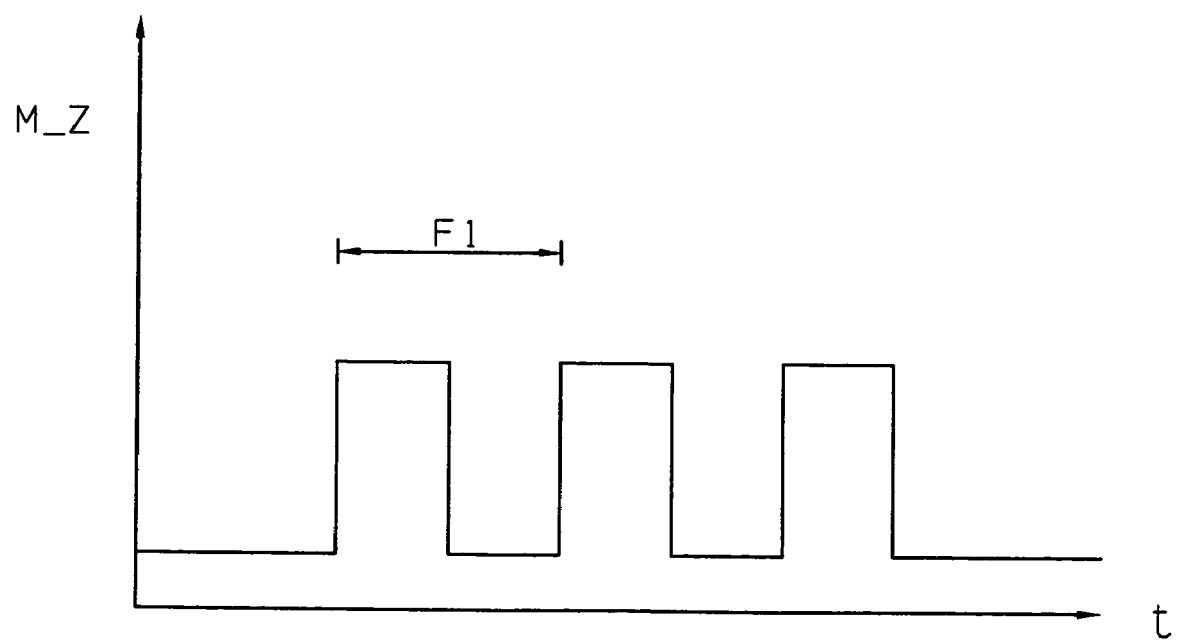
FIG. 2 is a diagram in which the pull moment M_Z of the vehicle, i.e., the vehicle's wheels, is plotted against the time t.

FIG. 2 presents the concept that the control apparatus can regulate the clutch actuator, for example, by an activation frequency F1, because of input vehicle and roadway specifics, as mentioned in the introductory comments, as well as by the surrounding circumstances as determined by appropriate sensors. The amplitude of this rocking process frequency can be the transmitted moment M_K from the clutch finally to the drive wheels of the vehicle or yet the pulling moment M_Z of the vehicle, which is necessary to escape an obstruction in the roadway.

Insofar as that during the rocking process, the surrounding circumstances, change themselves, which must be subject to consideration. This can also lead to an adjustment of the tuning of the frequency F1 at which frequency the starting clutch is obligated to function.

In this method of operation, it is possible that the vehicle driver can control the moment at which he would start and terminate the rocking process on his own.

The invention claimed is:

1. A method for controlling an actuator of a starting clutch of an automatic transmission of a motor vehicle independently of a vehicle operator to cause a back-and-forth rocking motion of the vehicle to free the vehicle from a roadway obstruction, the method comprising the steps of:
sensing
a driving speed of the vehicle below a predetermined limit,
at least one of
a slippage of at least one vehicle wheel exceeding a predetermined slippage threshold, and
a drive moment of a force acting against a vehicle wheel exceeding a predetermined drive moment threshold, and
a positioning of an operator controlled gas pedal exceeding a kick-down deflection angle, and
periodically activating the actuator to engage and disengage the starting clutch at an activation frequency (F1) selected to cause the back-and-forth rocking motion.

2. The method according to claim 1, wherein the activation frequency (F1) is determined by characteristics of the vehicle and of the roadway obstruction so that the vehicle is able to overcome the roadway obstruction.

3. The method according to claim 1, wherein:
the activation frequency (F1) is determined by at least one of
a vehicle speed,
a weight of the vehicle,
a radius of vehicle wheels,
ground contact of the vehicle wheels, and forces influenced by the roadway obstruction and arising from a rocking process of the vehicle and acting against progress of the vehicle in a current driving direction.

4. The method according to claim 1, further comprising the step of maintaining a constant transmission ratio during periodic operation of the actuator.

5. The method according to claim 1, further comprising the step of continuing periodic activation of the actuator to engage and disengage the starting clutch at the activation frequency (F1) selected to cause the back-and-forth rocking motion only if (1) a driving speed is very small or is zeros and (2) a slip of at least one of The vehicle driving wheels oversteps the predetermined slippage threshold.

6. The method according to claim 1, further comprising the step of continuing periodic activation of the actuator to engage and disengage the starting clutch at the activation frequency (F1) selected to cause the back-and forth rocking motion only if (1) the driving speed is below the predetermined limit, and (2) the drivel moment of a force acting against the vehicle wheel exceeds the predetermined drive moment threshold.

7. The method according to claim 1, further comprising the step of:
initiating periodic activation of the actuator to engage and disengage the starting clutch at the activation frequency (F1) selected to cause the back-and-forth rocking motion receiving an operator generated previous confirmation for activation of the periodic activation the actuator to engage and disengage the starting clutch to cause the back-and-forth rocking motion.

8. The method according to claim 1, further comprising the step of selecting the activation frequency(F1), for a periodic operation of the actuator, by adjustment of an actuation element.

9. The method according to claim 1, wherein:
the activation frequency (F1) is determined by at least one of
a vehicle speed,
a controlled direction,
a controlled distance, and
a speed of control of an activation element.

10. The method according to claim 1, further comprising the step of discontinuing periodic operation when the positioning of the operator controlled gas pedal is less than the kick-down deflection angle.

11. A method for controlling an actuator of a starting clutch of an automatic transmission of a motor vehicle, the method comprising the steps of:
providing a control unit for controlling the actuator in the following manner:
engaging the starting clutch when a starting operation request is received at a predetermined transmission ratio;
disengaging the starting clutch to end the starting operation;
controlling the actuator during the starting operation so as to periodically fluctuate a transmitted torque ($M\_K$); and
tuning the periodic fluctuation of the transmitted clutch actuator to characteristics of the motor vehicle and an obstacle in a drive path of the motor vehicle: and
automatically overcoming the obstacle in the drive path while maintaining the predetermined transmission ratio unchanged during the periodic fluctuation operation of the actuator or the starting clutch.

12. The method according to claim 11 further comprising the step of evaluating at least one of a vehicle speed, a vehicle mass, a radius of vehicle wheels, a grip of a vehicle tires and built-up forces, which act on the vehicle in overcoming the obstacle in the drive path for determination of the periodic actuation of the clutch actuator.

13. The method according to claim 11 further comprising the step of performing periodic fluctuation when the control unit detects that a driving speed is very slow or zero and a predetermined threshold value of slip is exceeded on at least one of powered wheels of the vehicle.

14. The method according to claim 11 further comprising the step of performing periodic fluctuation when a driving speed is very slow or zero and the control unit detects that forces counteracting driving torque ($M\_Z$) exceeded a predetermined threshold value.

15. The method according to claim 11 further comprising the step of performing periodic fluctuation when the control unit detects that a control element for actuation of the periodic fluctuation was actuated by a vehicle occupant.

16. The method according to claim 11 further comprising the step of selecting the frequency of actuation (F1) of periodic fluctuation of the actuator or the clutch according to a setting on the control unit.

17. The method according to claim 11 further comprising the step of determining through analysis of a vehicle speed, a control direction, a control travel, and a control speed of a control element.

18. The method according to claim 11 further comprising the step of using a gas pedal of an automotive engine as the control unit.

19. The method according to claim 11 further comprising the step of triggering periodic fluctuation when a gas pedal for power control of an automotive engine is actuated beyond a predetermined operating angle (kickdown position).

* * * * *